United States Patent
Proshan

[19]

[11] Patent Number: 5,813,756
[45] Date of Patent: Sep. 29, 1998

[54] MULTIBLADE WHISK

[76] Inventor: Mary-Elizabeth Proshan, 301 N. Harrison St., Princeton, N.J. 08540

[21] Appl. No.: 757,007

[22] Filed: Nov. 25, 1996

[51] Int. Cl.⁶ .................................................... A47J 43/10
[52] U.S. Cl. ........................................ 366/129; 416/70 R
[58] Field of Search .................................... 366/129, 130, 366/246, 328.2–328.4, 325.92, 325.93, 342–344; 416/69, 70 R, 227 R, 231 R, 231 A, 231 B, 235; 15/141.1, 141.2; 99/348; D7/376–380, 412–688, 690

[56] References Cited

U.S. PATENT DOCUMENTS

| | | | |
|---|---|---|---|
| 360,636 | 4/1887 | Wayland | 416/231 X |
| 1,281,610 | 10/1918 | Lundahl | 416/70 |
| 1,284,816 | 11/1918 | Thompson | 366/325.93 |
| 2,637,537 | 5/1953 | Ernst | 416/227 X |

Primary Examiner—Charles E. Cooley

[57] ABSTRACT

A whisk employs first and second members having the same shape and size. Each member is a flat, thin, somewhat flexible elongated element having a longitudinally extending centrally disposed axis of symmetry. The elements are connected together with coincident axes of symmetry. Each element has upper and lower opposite ends. The lower end of each element is flat, relatively long and disposed at right angles to the axes of symmetry to define a horizontal extension. The extensions of both elements intersect in a common horizontal plane disposed at right angles to the axes of symmetry. The upper ends are relatively short and extend longitudinally from a common position on each member which is located between its upper and lower ends. Each element has opposite sides of like convex curvature which extend outwardly and downwardly from opposite ends of each horizontal extension to said common position.

9 Claims, 3 Drawing Sheets

MULTIBLADE WHISK

CROSS REFERENCE TO COPENDING APPLICATIONS

This application is related to three other copending applications filed on the same date hereof. These applications are: Single Blade Whisks Ser. No. 08/757,006, Design of Multiblade Whisk, Ser. No. 29/063,066 and Design of Single Blade Whisk, Ser. No. 29/063,065.

BACKGROUND OF THE INVENTION

It often becomes necessary to heat and stir roux and similar sauces without burning them These sauces are normally prepared in sauce pans having flat bottom surfaces and curved walls wherein the sauces cover the entire surface area and also the lowest portion of the curved walls. In order to properly prepare such sauces, both the temperature and time of cooking is critical and the sauce must be completely and rapidly stirred. Known types of whisks employ wire loops having a round or oval shape and can be used efficiently in many different applications. However, such whisks are not suitable for stirring such sauces because the loops only engage the surface of the sauce pan at discrete points and are spaced from the walls whereby at least portions of the sauce can burn during stirring.

The present Invention is directed toward a new type of whisk which can be used to provide proper stirring of roux and other sauces during preparation and eliminate the risk of burning and the like.

SUMMARY OF THE INVENTION

Accordingly, it is an object of the present invention to provide a new and improved whisk which engages large areas of the surface of the sauce pan and by manual operation can engage the entire area of the surface as well as the appropriate portions of the walls in such manner as to provide proper stirring of roux and other sauces.

Another object is to provide a new and improved whisk having a unique geometry which permits it to engage large surface areas and walls of sauce pans and the like without abrading or scratching such surfaces and walls.

Still another object is to provide a new and improved whisk having a horizontal and flat lower end surface for engaging large surface areas of sauce pans and the like and at the same time having curved vertical surfaces for engaging the walls of such pans.

These and other objects and advantages of this invention will either be explained or will become apparent hereinafter.

In accordance with the principles of this invention, the whisk employs first and second members of like shape and size. Each member defines a flat, thin, somewhat flexible elongated element having a longitudinally extending centrally disposed axis of symmetry. These elements are connected together so that their axes of symmetry are coincident.

Each element has first and second opposite ends. The first and lower end of each element is flat, relatively long and disposed at right angles to the axes of symmetry to define a horizontal extension. The extensions of both elements intersect in a common horizontal plane disposed at right angles to the axes of symmetry.

The second and upper ends of both elements are relatively short and extend longitudinally from a common position on each member which is located between its first and second ends. Each element has opposite sides of like convex curvature which extend outwardly and downwardly from opposite ends of each horizontal extension to said common position.

Each axis of symmetry is defined by a longitudinally extending centrally disposed slot which extends from the first extension to said common position.

A handle is secured to the upper ends of both members.

In use, the lower ends of the members can engage a large surface area of a sauce pan while the curved sides of the members can engage the walls of the pan. The handle is manually rotated and moved as desired to produce the desired stirring action.

The entire whisk is constructed of plastic so that there is no scratching or abrading of engaged surfaces and walls during use.

BRIEF DESCRIPTIONS OF THE DRAWINGS

DETAILED DESCRIPTION OF PREFERRED EMBODIMENT

Figure 1:
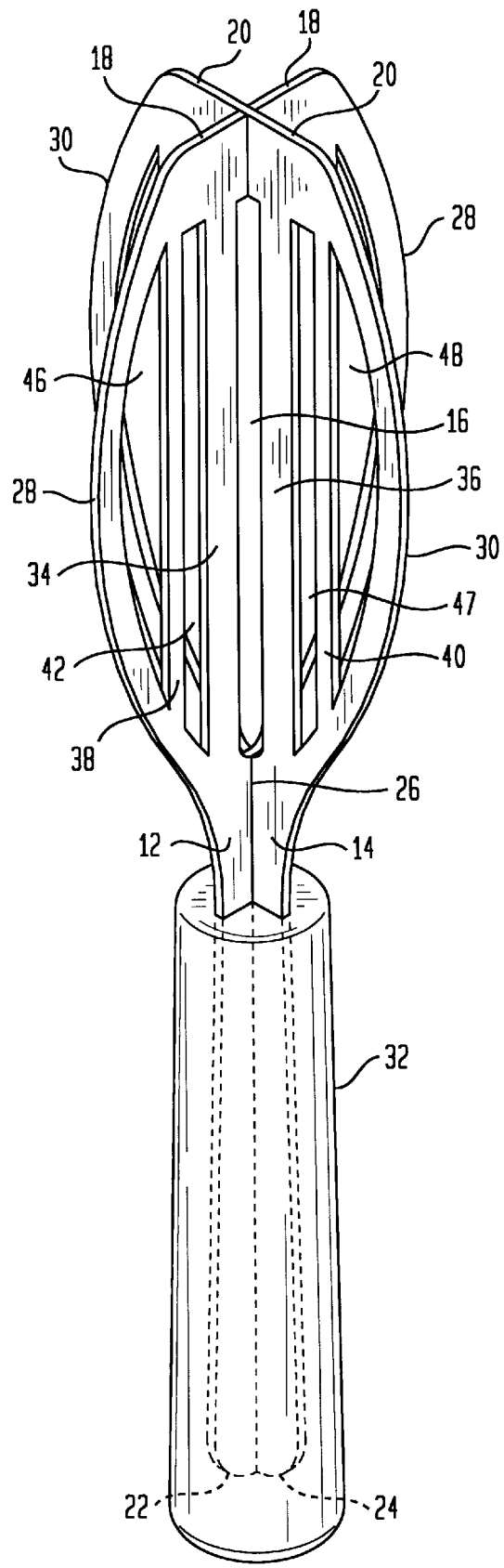
FIG. 1 is a perspective view of a preferred embodiment of the invention.

Referring now to FIGS. 1–5, the whisk employs first and second members 12 and 14, each having the same shape and size. Each member being a flat, thin, somewhat flexible elongated element having a longitudinally extending centrally disposed axis of symmetry 16; these elements are connected together so that their axes of symmetry are coincident.

Elements 12 and 14 have respectively first and lower ends 18 and 20 and second and upper ends 22 and 24. The lower ends of these element are flat, relatively long and disposed at right angles to the axes of symmetry to define horizontal extensions 18—18 and 20—20. The extensions of both elements intersect in a common horizontal plane disposed at right angles to the axes of symmetry.

The second and upper ends 22 and 24 of these elements are relatively short and extend longitudinally from a common position 26 on each member which is located between said first and second ends.

These element each have opposite sides 28 and 30 of like convex curvature which extend outwardly and downwardly from opposite ends of each horizontal extension to said common position.

Each axis of symmetry forms a longitudinally extending centrally disposed slot 16 which extends between the extensions and said common position.

A handle 32 engages and receives both ends and extends to a position adjacent the common position.

In this preferred embodiment, the first and second members are disposed at right angles to each other. The two extensions intersect and define a cross in cross section as shown in detail in FIGS. 4 and 5.

Each member has first and second like longitudinally extending bars, shown at 34 for member 12 and 36 for member 14 which are disposed adjacent the common slot 16.

Each member has third and fourth longitudinally extending bars shown at 38 for member 12 and 40 for member 14 which lie in corresponding common planes with corresponding bars 34 and 36 and are separated therefrom by corresponding vertical slots 42 and 44. Bars 34 and 36 are wider and hence stronger than bars 38 and 40.

Each pair of curved sides 28 for member 12 and 30 for member 14 is separated by corresponding slots 46 and 48 from corresponding bars 38 and 40. Sides 28 and 30 are narrower than bars 34 and 36 and have about the same strength as bars 38 and 40.

In use, the lower ends provide substantial area engagement of a sauce pan or the like as previously described and bars 34 and 36 are sufficiently strong to prevent bending or curving of the whisk. At the same time, bars 38 and 40 and the curved sides 28 and 30 are more flexible than bars 34 and 36 and permit easier engagement with curved walls of the pans.

Figure 2:
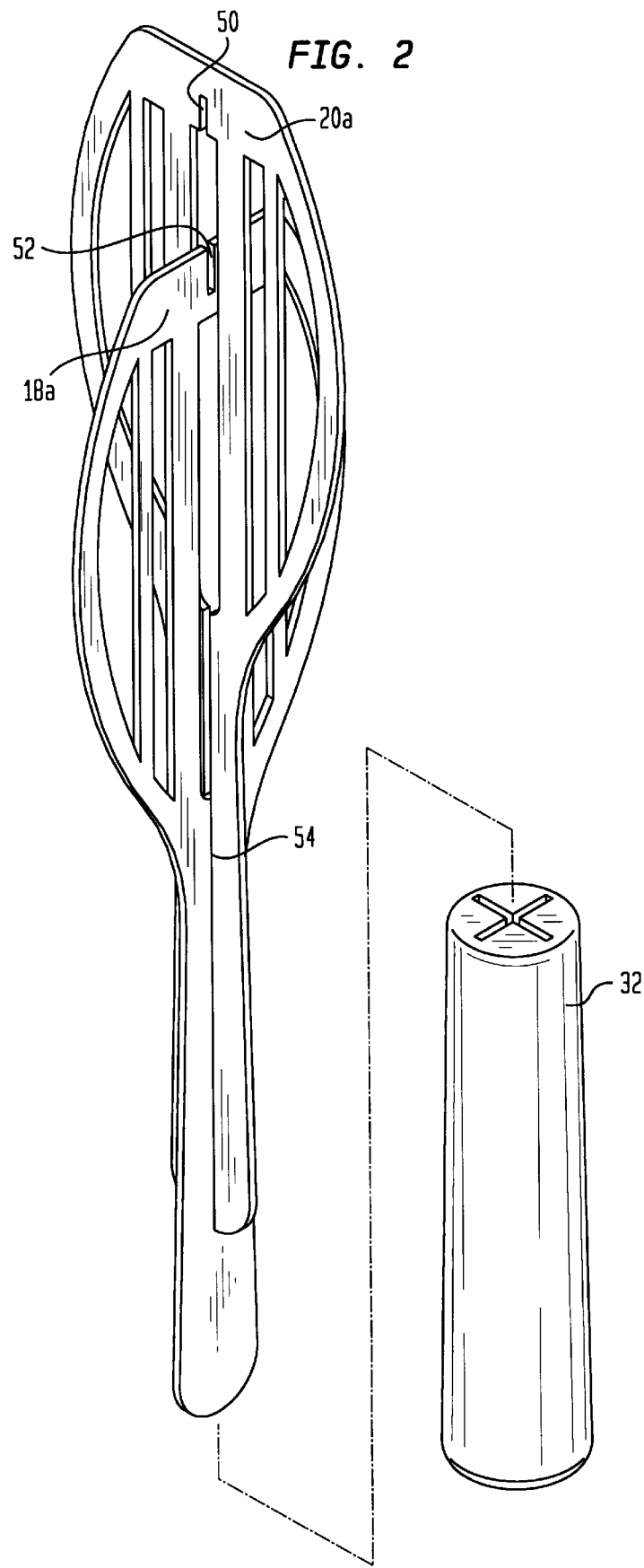
FIG. 2 is a partially disassembled view of the structure of FIG. 1, illustrating a method of assembling the parts to produce the complete structure.
Figure 3:
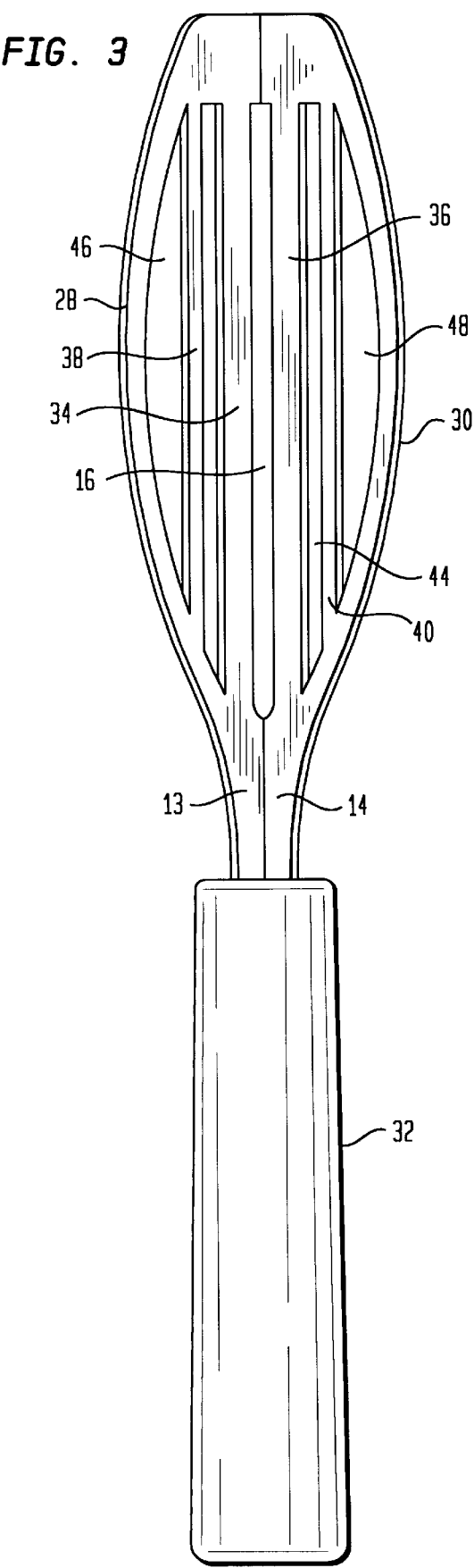
FIG. 3 is a side view of the structure shown in FIG. 1.
Figure 4:
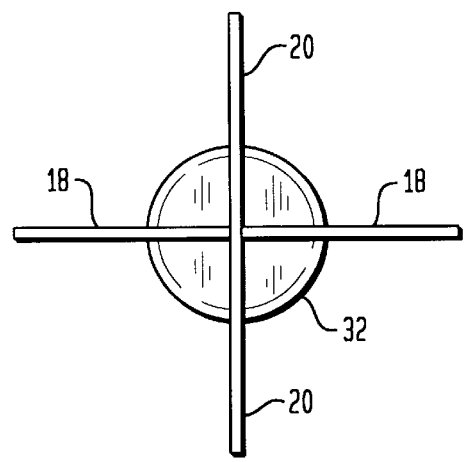
FIG. 4 is a bottom view of the structure shown in FIG. 1.
Figure 5:
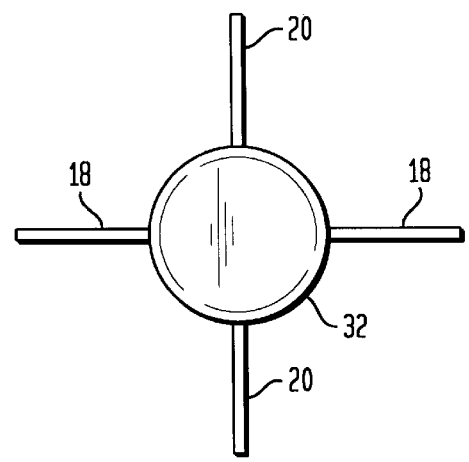
FIG. 5 is a top view of the structure shown in FIG. 1.

As shown in FIG. 2, the lower ends 18 and 20 have flattened vertical regions 18a and 20a respectively. Region 20a has a centrally disposed vertical slit 50 which extends upwardly part way from slot 16. Region 18a has a centrally disposed vertical slit 52 which extends downwardly part way from extension 18—18. Member 14 has a centrally disposed vertical slot 54 which extends from common region 26 to its upper end. This arrangement enables the two members to be interconnected at right angles with the slits 50 and 52 being engaged and the corresponding portion of member 12 engaging slot 54.

The handle can have grooves for receiving the interconnected members or can be molded therearound. The entire whisk is formed of plastic so that it cannot abrade or stratch pan surfaces or walls.

While the invention has been described with particular reference to the drawings and preferred embodiments, the protection solicited is to be limited only by the terms of the claims which follow.

What is claimed is:

1. A whisk comprising:

first and second members having the same shape and size, each member being a flat, thin, somewhat flexible elongated element having a longitudinally extending centrally disposed axis of symmetry;

said elements being connected together so that their axes of symmetry are coincident;

each element having first and second opposite ends;

the first and lower end of each element being flat, relatively long and disposed at right angles to the axes of symmetry to define a horizontal extension, the extensions of both elements intersecting in a common horizontal plane disposed at right angles to the axes of symmetry;

the second and upper ends of both elements being relatively short and extending longitudinally from a common position on each member which is located between said first and second ends;

each element having opposite sides of like convex curvature which extend outwardly and downwardly from opposite ends of each horizontal extension to said common position.

2. The whisk of claim 1 wherein each axis of symmetry is defined by a longitudinally extending centrally disposed slot which extends between the horizontal extension and said common position.

3. The whisk of claim 2 further including handle means secured to said second ends.

4. The whisk of claim 3 wherein said first and second members are disposed at right angles to each other.

5. The whisk of claim 4 wherein the extensions intersect and define a cross in cross section.

6. The whisk of claim 5 wherein each member is provided with at least first and second additional slots which are disposed symmetrically on opposite sides of the slot defining the axis of symmetry, each additional slot being disposed between and spaced from the axis of symmetry and the adjacent convex side.

7. The whisk of claim 6 wherein the first ends of said members are provided with cooperating engagement means.

8. The whisk of claim 7 wherein the engagement means of one member defines a first vertical slit which extends downwardly from the outer edge of its horizontal extension and is aligned with and spaced from the axes of symmetry, the engagement means of the other member defining a second vertical slit which is aligned with and is an extension of the axes of symmetry, the first and second slits being in mating engagement.

9. The whisk of claim 8 wherein one of the members has a centrally disposed longitudinally extending longitudinal slit which extends from the common position through its second end.

* * * * *